United States Patent [19]

Luhleich et al.

[11] 4,009,143

[45] Feb. 22, 1977

[54] PROCESS FOR PRODUCING CARBONACEOUS SUBSTANCES FOR USE IN SYNTHETIC-GRAPHITE AND GRAPHITE-LIKE BODIES

[75] Inventors: Hartmut Luhleich, Duren; Hubertus Nickel, Julich; Peter Pflaum, Julich; Francesco Dias, Julich, all of Germany

[73] Assignee: Kernforschungsanlage Julich Gesellschaft mit beschrankter Haftung, Julich, Germany

[22] Filed: June 29, 1972

[21] Appl. No.: 267,480

[30] Foreign Application Priority Data

June 30, 1971 Germany .......................... 2132492

[52] U.S. Cl. ................................ 260/38; 106/278; 106/284
[51] Int. Cl.[2] .......................................... C08K 3/04
[58] Field of Search ............ 106/36, 281, 283, 284, 106/277; 260/38

[56] References Cited

UNITED STATES PATENTS

| | | | |
|---|---|---|---|
| 1,699,537 | 1/1929 | Jones et al. ..................... | 106/277 X |
| 1,725,648 | 8/1929 | Kirschbraun ............... | 106/277 UX |
| 2,525,835 | 10/1950 | Schmutzler .......................... | 260/38 |
| 2,733,159 | 1/1956 | Scoggin et al. ..................... | 106/277 |
| 3,303,031 | 2/1967 | Shields .............................. | 106/284 X |
| 3,346,678 | 10/1967 | Ohlgren .............................. | 260/38 |
| 3,391,103 | 7/1968 | Mueller .............................. | 260/38 |
| 3,519,593 | 7/1970 | Bolger .............................. | 260/38 |

*Primary Examiner*—Paul R. Michl
*Attorney, Agent, or Firm*—Karl F. Ross; Herbert Dubno

[57] ABSTRACT

Carbonaceous material such as carbon powder is coated with a carbonizable binder in a continuous process in which the carbon particles and the binder, preferably together with a solvent, are introduced continuously into a vessel in which a continuous stream of a liquid vehicle in which the binder is insoluble is likewise introduced. The coated particles are then separated from the liquid phase by decantation or filtration.

4 Claims, 1 Drawing Figure

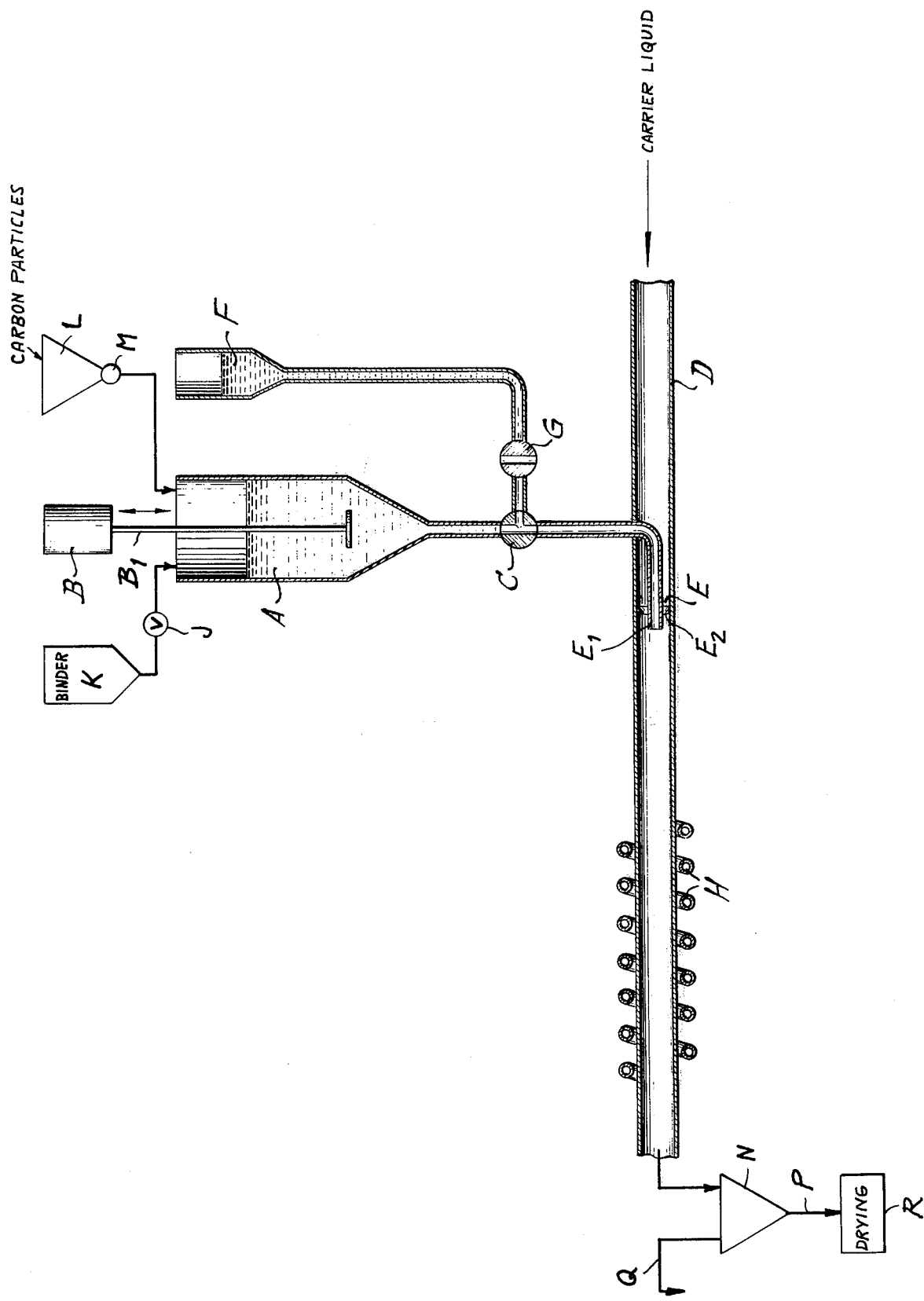

PROCESS FOR PRODUCING CARBONACEOUS SUBSTANCES FOR USE IN SYNTHETIC-GRAPHITE AND GRAPHITE-LIKE BODIES

Field of the Invention

Our present invention relates to a process for producing particulate materials for use in synthetic-graphite or graphite-like bodies and, more particularly, to a process for coating carbonaceous particles with a synthetic resin or other carbonizable binder.

BACKGROUND OF THE INVENTION

In the art of forming carbonaceous bodies, especially synthetic-graphite bodies and graphite or graphite-like bodies, it is frequently desirable to use powdered carbonaceous materials, some of which may be waste products or by-products of other processes. The powdered materials may include electrographite and natural graphite, but generally are milled or ground petroleum coke, carbon black and other carbonaceous materials which may be powdered or pulverized before use or may be obtained naturally in a powdered or pulverulent state.

Graphite and synthetic-graphite bodies have been employed heretofore for many purposes and in various industries. They have particular value, however, in nuclear-reactor technology and preferably in high-temperature gas-cooled nuclear reactors in which the graphitic bodies may be used as part of the nuclear reactor core structure, as enclosures or casings for nuclear-fuel elements or for breeder elements participating in a breeding nuclear reaction, and as outer coverings of nuclear reactor fuel or breeder particles.

In the commonly assigned concurrently filed copending Application Ser. No. 267,479 entitled "METHOD OF MAKING SHAPED CARBONACEOUS BODIES" and filed by three of the present applicants, there is described a method of making shaped synthetic-graphite of graphitic bodies using synthetic-resin binders, tar, or pitch. The binder, preferably a phenol-formaldehyde resin, is carbonizable and, after the moist body is formed from coated carbonaceous filler particles, the structure is dried and then cokefied in accordance with conventional techniques.

Graphite or graphite-like materials are especially desirable in the production of fuel elements or other structural parts of gas-cooled high-temperature nuclear reactors because of the refractory character of the material and its neutron cross section. After the mixture is shaped into the desired configuration, it is heated to about 800° C. or higher to carbonize the binder, the cokefication process being as well as graphitization process in accordance with conventional teachings. In this regard reference may be made to the publication "Carbon and Graphite Handbook", Charles L. Mantell, Interscience Publishers, New York 1968, p. 266.

In conventional systems for providing a shapable carbon-containing mass for subsequent graphitization and cokefication, it has been the common practice to simply blend the carbon particles, usually electrographite, natural graphite, comminuted petroleum coke and carbon black, with the synthetic-resin binder or a cokefiable binder of a bituminous base, e.g. tar or pitch. The blended mass is then shaped and heated.

These conventional processes, however, have been found to be disadvantageous in that the distribution of the binder is found to be nonuniform in the shaped body because the binder does not necessarily uniformly cost all of the grains of the filler. During the process of evaporation of volatile components of the binder system, the binder tends to concentrate in certain areas free from the binder material. As a result, the cokefied or graphitized mass is found to be less homogeneous than is desirable and lacks uniform porosity and other advantageous mechanical properties.

OBJECTS OF THE INVENTION

It is the principal object of the present invention to provide a system for uniformly coating filler particles of a carbonaceous material with a synthetic resin or other carbonizale binder.

It is another object of the present invention to provide a system for producing synthetic-graphite and graphite-like materials that is more economical than earlier systems and yields a carbonaceous mass which may be shaped or otherwise converted into rigid bodies with excellent mechanical properties and particular suitability for use in nuclear reactors.

It is also an object of the invention to provide an improved method of making a carbonizable or graphitizable mass for use in bodies of the character described without the disadvantages discussed earlier.

SUMMARY OF THE INVENTION

These objects and others which will become apparent hereinafter are attained, in accordance with the present invention, by slurrying grains of a carbonaceous material, generally comminuted petroleum coke, carbon black, electrographite or natural graphite, in a liquid phase consisting of a binder and a solvent or liquid component in which the binder is completely or partially soluble; the slurry is then injected into a liquid phase miscible with the solvent in which the binder is at most only slightly soluble.

The slurrying is carried out in a mixing chamber and the slurry dispersed in the liquid phase by means of a mixing nozzle in a continuous or substantially continuous manner and it is found that the resulting filler grains are substantially uniformly coated with the binder.

After the two phases, i.e. the solid phase and the liquid phase, have been brought into agitated contact via the mixing nozzle, the coated filler particles are permitted to settle or are removed by filtration from the liquid phase. The latter may be decanted so that the major part of the carrier liquid is recovered. Thereafter, the mass may be dried.

Because of the continuous flow of starting materials and products through the system, large quantities of filler particles and binder may be mixed together. The continuous operation also has the significant advantage over the conventional systems that particularly large proportions of binder may be applied uniformly to the filler grains. In practice, it has been found that up to 70% by weight of the binder component may be applied, the actual percentage being a function of the available surface area.

A further advantage of the process according to the present invention resides in that the mixture formed in the mixing chamber and consisting of the filler, the binder, the carrying liquid and the solvent, is heated and is transformed into a form in which the binder-coated filler grains are highly sedimentable or settleable from the carrier liquid, thereby facilitating the separation mentioned earlier. Because the particles tend to remain discrete, subsequent milling and like handling steps may be, to a large measure, avoided.

DESCRIPTION OF THE DRAWING

The above and other objects, features and advantages of the present invention will become more readily apparent from the following description, reference being made to the accompanying drawing of which the sole FIGURE is a flow diagram in vertical cross section of an apparatus for carrying out the invention.

SPECIFIC DESCRIPTION

The apparatus illustrated in the diagram comprises an upright vessel A to which a binder may be fed via a metering valve J from a reservoir K while the carbonaceous particles are delivered from a hopper L via metering device M. The vessel A is fitted with a vibrator B whose stem $B_1$ is vertically reciprocable in vessel A and serves to maintain the homogeneity of the carbon particle/binder mixture received in the vessel A. The mass in vessel A is thus a slurry which is continuously produced and agitated as the binder and the carbon particles are continuously admitted into the vessel.

A three-way valve C connects the conical base of vessel A with the mixing nozzle E. The valve C also is connected to a storage vessel F for the solvent of the binder and meters this solvent into the system at a rate determined by the position of a valve G. The nozzle E is of the Venturi type and is provided in a duct D for the carrier liquid, e.g. water. The nozzle E comprises a central tube $E_1$ opening coaxially within duct D in the direction of carrier liquid flow and a frustoconical deflector $E_2$ surrounding the tube $E_1$ and constricting the flowpath therearound. Downstream of the mixing nozzle is a heating strip surrounded by a heating coil H. The end of the tube D communicates with a conical settling vessel N from which the particles are removed at P while the excess liquid is decanted at Q. The moist binder-coated particles may then be dried at R, powdered or otherwise comminuted at S.

In operation, the vibrator B is so disposed in the vessel A as to prevent settling of the grains and ensures a substantially uniform coating thereof. The vibrator B likewise serves to dislodge air adherent to the surface of the carbon grain.

As the slurry of carbon particles and binder enters the mixing nozzle E, it is emulsified and suspended in the carrier liquid and a uniform distribution of the binder over the grains of the filler is ensured. A small quantity of the solvent in which the binder is soluble and which, in turn, is miscible with the carrier fluid, is periodically admitted from the vessel F. The solvent may be used also to clear the valve C and the mixing tube E, and ensure a continuous operation. Some small quantity of the solvent may, in addition or alternatively, be added directly to the vessel A.

To improve the sedimentation of the coated particles as discrete bodies, the carrier liquid containing the binder-coated particles, binder and solvent, is heated at H as discussed above.

The heated stage results in a transformation in the heterogenous mixture and is detectable by a change in coloration of the slurry. This transformation facilitates separation of the slurry from the carrier liquid. The slurry is then dried or otherwise processed as discussed earlier.

SPECIFIC EXAMPLE 4 kg of phenol-formaldehyde resin binder are dissolved in 20 liters of a solvent and heated up to 40° C. The solvent of the present Example is methanol although other alcohols miscible with water and capable of solubilizing the binder may also be used. 6 kg of fine-grained electrographite with a particle size of about 0.06 mm are added under vibration to the binder-solution in the vessel A with the valve C closed; the resulting slurry being cooled to about 5° C. Then valve C is opened and the slurry flows to the mixing nozzle. The carrier fluid is water with which the solvent is miscible and the phenol-formaldehyde binder is not or only slightly soluble. The water is pressed with 7 atm through tube D in the direction of the mixing nozzle. 100 liters of water was used as the carrier liquid for the indicated quantity of filler and binder. During the dispersion stage, the carrier fluid was heated to 35° – 40° C and the color changed to a deep black. The particles were then separated, recovered and dried, the drying resulting in particles which could be shaped directly as described in the aforementioned application.

We claim:

1. A process for producing a carbonaceous mass for the production of shaped bodies, comprising the steps of:
   slurrying particles of a carbonaceous filler selected from the group which consists of graphite, coke and carbon black in a binder at least partly dissolved in a solvent and selected from the group which consists of phenol-formaldehyde resin to produce a slurry of binder-coated particles;
   continuously dispersing said slurry by supplying it from a nozzle continuously into a codirectionally-flowing continuous stream of a liquid in which said binder is at most slightly soluble and which is miscible with said solvent to form discrete binder-coated grains of the filler; and
   decanting excess quantities of said liquid from said discrete binder-coated grains to form said mass.

2. The process defined in claim 1 wherein said solvent is methylalcohol and said liquid is water.

3. The process defined in claim 2 wherein said slurry is formed continuously by metering said filler and said binder into a mixing vessel and agitating said binder and said filler in said vessel with a vibrator.

4. The process defined in claim 2 wherein said solvent is added to said binder prior to forming said slurry in said vessel.

* * * * *